US010861465B1

(12) United States Patent
Vines et al.

(10) Patent No.: US 10,861,465 B1
(45) Date of Patent: Dec. 8, 2020

(54) AUTOMATIC DETERMINATION OF SPEAKER LOCATIONS

(71) Applicant: DTS, Inc., Calabasas, CA (US)

(72) Inventors: Gregory Vines, Poway, CA (US); Vlad Ionut Ursachi, Santa Clara, CA (US); Glen Stone, Los Gatos, CA (US)

(73) Assignee: DTS, Inc., Calabasas, CA (US)

( * ) Notice: Subject to any disclaimer, the term of this patent is extended or adjusted under 35 U.S.C. 154(b) by 0 days.

(21) Appl. No.: 16/598,438

(22) Filed: Oct. 10, 2019

(51) Int. Cl.
| *H04R 29/00* | (2006.01) |
| *H04R 5/00* | (2006.01) |
| *H04S 7/00* | (2006.01) |
| *G10L 17/06* | (2013.01) |
| *H04R 5/04* | (2006.01) |
| *H04R 5/02* | (2006.01) |

(52) U.S. Cl.
CPC ............ *G10L 17/06* (2013.01); *H04R 5/02* (2013.01); *H04R 5/04* (2013.01); *H04R 29/001* (2013.01); *H04S 7/308* (2013.01)

(58) Field of Classification Search
CPC .... H04R 29/00; H04R 29/001; H04R 29/002; H04R 3/00; H04R 3/004; H04R 3/008; H04R 3/12; H04R 5/00; H04R 5/02; H04R 5/04; H04S 7/301; H04S 7/302; H04S 7/305; H04S 7/308; H04S 3/00; H04S 3/008; H04S 2400/11; G10L 17/06
See application file for complete search history.

(56) References Cited

U.S. PATENT DOCUMENTS

| 7,158,643 | B2 * | 1/2007 | Lavoie | H04S 7/301 |
| | | | | 381/303 |
| 7,630,501 | B2 | 12/2009 | Blank et al. | |
| 8,199,941 | B2 | 6/2012 | Hudson et al. | |
| 9,288,597 | B2 | 3/2016 | Carlsson et al. | |
| 9,986,359 | B1 | 5/2018 | Shi et al. | |
| 2002/0159611 | A1 * | 10/2002 | Cromer | H04S 7/301 |
| | | | | 381/303 |
| 2012/0117502 | A1 * | 5/2012 | Nguyen | G06T 7/55 |
| | | | | 715/769 |
| 2013/0027517 | A1 * | 1/2013 | Kim | H04N 13/128 |
| | | | | 348/46 |
| 2013/0051572 | A1 * | 2/2013 | Goh | H04S 7/302 |
| | | | | 381/59 |
| 2015/0016642 | A1 | 1/2015 | Walsh et al. | |
| 2016/0309258 | A1 * | 10/2016 | Hiscock | H04R 5/04 |
| 2018/0091916 | A1 * | 3/2018 | Alexandropoulos | H04R 3/12 |
| 2018/0192223 | A1 * | 7/2018 | Satheesh | H04S 7/301 |
| 2018/0242095 | A1 * | 8/2018 | Patil | H04R 5/02 |
| 2018/0255398 | A1 * | 9/2018 | Fischer | G06F 3/162 |
| 2019/0215634 | A1 * | 7/2019 | Doolittle | H04R 1/406 |

* cited by examiner

*Primary Examiner* — Thang V Tran
(74) *Attorney, Agent, or Firm* — Lerner David

(57) ABSTRACT

The technology relates to determining speaker positioning in a multichannel sound system. In one example, one or more controllers perform time of flight measurements between one or more pairs of speakers of the plurality of speakers. A distance between each of the one or more pairs of speakers based on the time of flight measurements is determined A location of each speaker in the one or more pairs of speakers relative to the other speakers in the one or more pairs of speakers is determined. Based on the determined location of each speaker the multichannel sound system is calibrated.

28 Claims, 9 Drawing Sheets

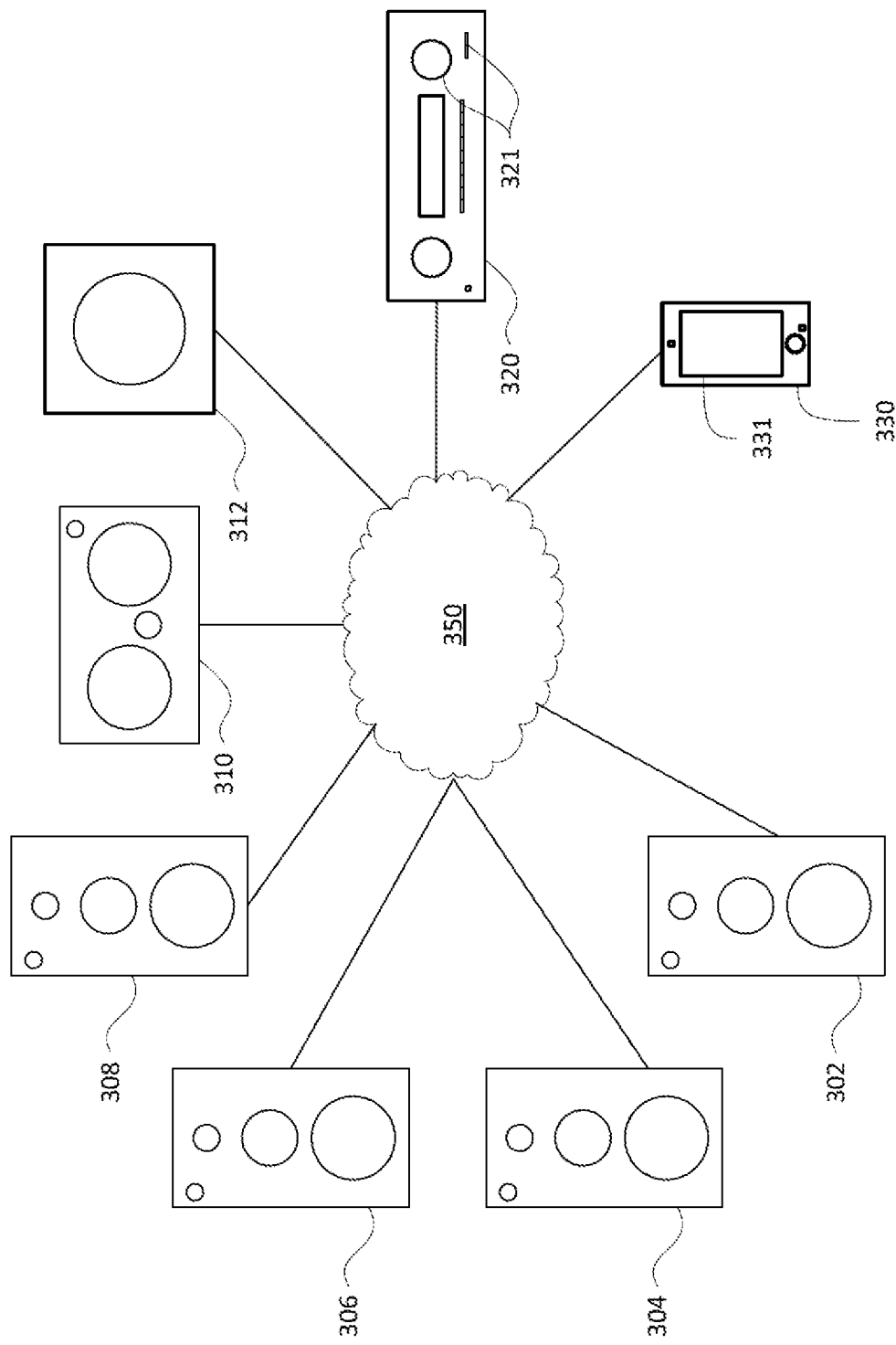

AUTOMATIC DETERMINATION OF SPEAKER LOCATIONS

BACKGROUND

Multichannel sound systems include two or more speakers positioned throughout a listening environment. Typically, a multichannel sound system may be capable of playing audio content that is produced in formats designed for playback on a particular number of speakers positioned in a recommended arrangement relative to a listener or other location within the listening environment. The audio content may include individual audio channels intended for simultaneous playback via respective individual speakers of a multichannel sound system.

BRIEF SUMMARY

One aspect of the disclosure provides a method for determining speaker positioning in a multichannel sound system. The method includes performing, by one or more controllers, time of flight measurements between one or more pairs of speakers of a plurality of speakers. The one or more controllers may determine a distance between each of the one or more pairs of speakers based on the time of flight measurements and determine a location of each speaker in the one or more pairs of speakers relative to other speakers in the one or more pairs of speakers. The multichannel sound system may be calibrated based on the determined location of each speaker.

The method may further include performing additional time of flight measurements between one or more speakers of the plurality of speakers and a user device; and determining a distance between each of the one or more speakers and the user device based on the additional time of flight measurements. Determining the location of each speaker in the one or more pairs of speakers relative to the other speakers in the one or more pairs of speakers may further include determining the location of each speaker in the one or more pairs of speakers relative to the user device. The user device may be located in a listening position when the time of flight measurements are performed.

In some instances, performing the time of flight measurements between one or more pairs of speakers may include, for each pair of speakers, transmitting a signal from a first speaker in the pair of speakers to a second speaker in the pair of speakers at a first time; receiving, by the second speaker, the transmitted signal at a second time; transmitting, by the second speaker, a return signal to the first speaker at a third time; and receiving, by the first speaker, the return signal at a fourth time. The first time, the second time, the third time, and the fourth time may be different for each pair of speakers.

The method may include detecting, by a receiver of the first speaker, the transmitted signal from the first speaker to the second speaker at a fifth time; and detecting, by a receiver of the second speaker, the return signal from the second speaker to the first speaker at a sixth time. Determining the distance between each of the one or more pairs of speakers based on the time of flight measurements may include determining the distance based on the respective first, second, third, fourth, fifth, and sixth time of the pairs of speakers.

The transmitted signal and/or the return signal may be transmitted by one or more of a driver, IR transmitter, RF transmitter, or ultrasonic receiver. The transmitted signal and/or the return signal may be received by one or more of a microphone, IR receiver, RF receiver, or ultrasonic receiver. The transmitted signal and/or the return signal may be a maximum length sequence signal. The transmitted signal and/or the return signal may have peaked autocorrelation. The transmitted signal and/or the return signal may be embedded into an audio signal.

In some instances, the distance between each of the one or more pairs of speakers may be input into a distance matrix and determining the location of each speaker in the one or more pairs of speakers relative to the other speakers in the one or more pairs of speakers includes using Eigen decomposition and/or gradient descent of the distance matrix.

In some instances, determining the location of each speaker in the one or more pairs of speakers relative to the other speakers in the one or more pairs of speakers may include determining an elevation and a distance of the each speaker relative to the other speakers.

The method may include, prior to performing the time of flight measurements between the one or more pairs of speakers of the plurality of speakers, receiving an indication that a speaker in the plurality of speakers has been moved and/or removed; and upon detecting the speaker in the plurality of speakers has been moved and/or removed, performing the time of flight measurements between the one or more pairs of speakers of the plurality of speakers.

Another aspect of the disclosure provides a system for determining speaker positioning in a multichannel sound system. The system may include a plurality of speakers and one or more processors. Each speaker may include at least one transmitter and at least one receiver. The one or more processors may be configured to perform time of flight measurements between one or more pairs of speakers of the plurality of speakers; determine a distance between each of the one or more pairs of speakers based on the time of flight measurements; determine a location of each speaker in the one or more pairs of speakers relative to the other speakers in the one or more pairs of speakers; and calibrate the multichannel sound system based on the determined location of each speaker.

In some instances the one or more processors are further configured to: perform additional time of flight measurements between one or more speakers of the plurality of speakers and a user device; and determine a distance between each of the one or more speakers and the user device based on the additional time of flight measurements. Determining the location of each speaker in the one or more pairs of speakers relative to other speakers in the one or more pairs of speakers may further include determining the location of each speaker in the one or more pairs of speakers relative to the user device. The user device may be located in a listening position when the time of flight measurements are performed.

Performing the time of flight measurements between one or more pairs of speakers may include, for each pair of speakers, transmitting a signal from a first speaker in the pair of speakers to a second speaker in the pair of speakers at a first time; receiving, by the second speaker, the transmitted signal at a second time; transmitting, by the second speaker, a return signal to the first speaker at a third time; and receiving, by the first speaker, the return signal at a fourth time. The first time, the second time, the third time, and the fourth time may be different for each pair of speakers. Determining the distance between each of the one or more pairs of speakers based on the time of flight measurements may include determining the distance based on the respective first, second, third, and fourth time of the pairs of speakers.

The at least one transmitter may be one or more of a driver, IR transmitter, RF transmitter, or ultrasonic receiver. The at least one receiver may be one or more of a microphone, IR receiver, RF receiver, or ultrasonic receiver. The transmitted signal and/or the return signal may be a maximum length sequence signal. The transmitted signal and/or the return signal may have peaked autocorrelation. The transmitted signal and/or the return signal may be embedded into an audio signal.

In some instances, the distance between each of the one or more pairs of speakers may be input into a distance matrix and determining the location of each speaker in the one or more pairs of speakers relative to the other speakers in the one or more pairs of speakers includes using Eigen decomposition and/or gradient descent of the distance matrix.

In some instances, determining the location of each speaker in the one or more pairs of speakers relative to the other speakers in the one or more pairs of speakers may include determining an elevation and a distance of the each speaker relative to the other speakers.

The one or more processors may be further configured to: prior to performing the time of flight measurements between the one or more pairs of speakers of the plurality of speakers, receive an indication that a speaker in the plurality of speakers has been moved and/or removed; and upon detecting the speaker in the plurality of speakers has been moved and/or removed, perform the time of flight measurements between the one or more pairs of speakers of the plurality of speakers.

Another aspect of the disclosure is directed to a non-transitory computer-readable medium storing instructions. The instructions, when executed by one or more processors, may cause the one or more processors to: perform time of flight measurements between one or more pairs of speakers of the plurality of speakers; determine a distance between each of the one or more pairs of speakers based on the time of flight measurements; determine a location of each speaker in the one or more pairs of speakers relative to the other speakers in the one or more pairs of speakers; and calibrate the multichannel sound system based on the determined location of each speaker.

The instructions may further cause the one or more processors to: perform additional time of flight measurements between one or more speakers of the plurality of speakers and a user device; and determine a distance between each of the one or more speakers and the user device based on the additional time of flight measurements. Determining the location of each speaker in the one or more pairs of speakers relative to other speakers in the one or more pairs of speakers may further include determining the location of each speaker in the one or more pairs of speakers relative to the user device.

BRIEF DESCRIPTION OF THE DRAWINGS

The present technology is illustrated by way of example, and not by way of limitation, in the figures of the accompanying drawings in which like reference numerals refer to similar elements including:

FIG. 3 is an example illustration of a multichannel sound system in accordance with aspects of the disclosure.

DETAILED DESCRIPTION

Overview

This technology relates to the automatic setup and calibration of a multichannel sound system having two or more speakers. For instance, speaker locations relative to each other may be determined using a time of flight measurement of acoustical signals sent between pairs of speakers. In this regard, a transmitter and sensor at each speaker may send and receive signals, respectively. The time of flight of the signals between the speaker pairs may then be used to compute the distances between the speaker pairs. In instances of three or more speakers, the distances between each of the speakers may be used to determine the location of each speaker relative to the others. The multichannel sound system may be calibrated using the known locations of each speaker relative to the other so that during playback to a listener the audio content sounds the same, or nearly the same, as it would on a multichannel sound system with speakers positioned in the recommended arrangement.

Figure 1:
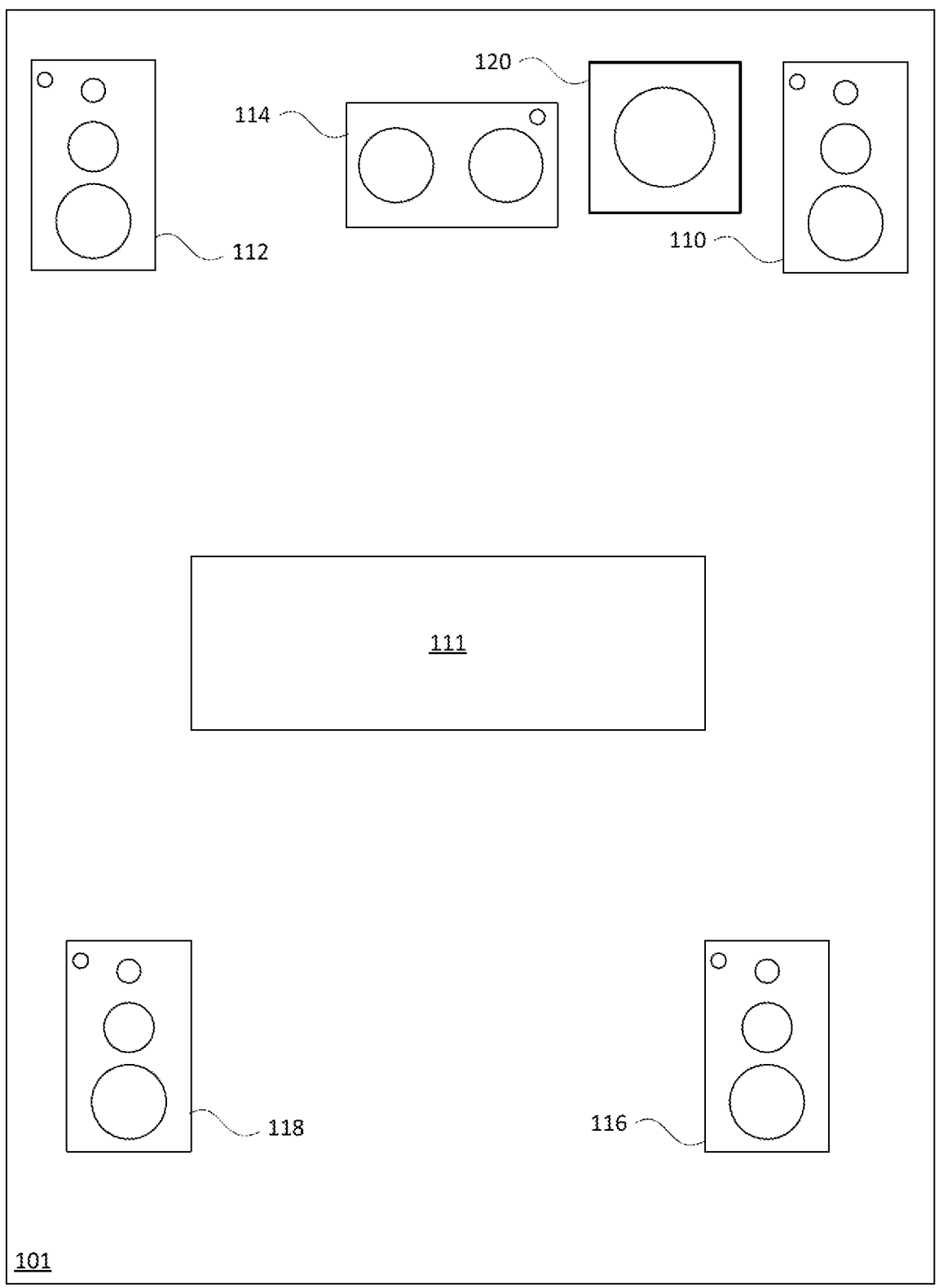
FIG. 1 is an example illustration of a recommended speaker setup for a multichannel sound system in accordance with aspects of the disclosure.

As previously explained, the number of speakers in a multichannel sound system, and their positions within a listening environment, is typically based on a recommended arrangement corresponding to audio formats supported by the multichannel sound system. Common audio formats, may be configured to provide audio to multichannel sound systems having 2.1, 5.1, 7.1, 7.1.2, 7.1.4, 9.1, 9.2.4 11.2.2, etc., setups, where the first number indicates the number of surround speakers, the second number indicates the number of subwoofers, and the third number, if present, indicates the number of height speakers. Each of these multichannel sound systems may have a recommend speaker arrangement within a listening environment. For instance, and as illustrated in FIG. 1, the recommended arrangement for speakers in a 5.1 setup within a listening environment 101 may include three surround speakers, a front right 110, a front left 112, and a center 114 positioned in front of the listening position 111. The recommend arrangement for the two other surround speakers including a rear right speaker 116 and a rear left speaker 118 may be behind the listening position 111. A subwoofer 120, the "0.1" of the 5.1 setup, may also be placed in front of the listening position 111. Some audio formats, such as Ambisonics, may not have a recommended arrangement of speakers, rather, the audio signal sent to each speaker may be adjusted based on the arrangement of speakers in the listening environment.

Listening environments, such as TV rooms, home theaters, offices, etc., may not allow for the placement of speakers in an arrangement recommended for a particular format supported by the multichannel sound system. In this regard, objects such as walls, doors, furniture, pictures, etc., may prevent one or more speakers from being positioned according to the recommended arrangement. Aesthetic preferences, such as a preference to keep speakers in or out of certain locations, may also prevent one or more speakers from being positioned according to the recommended arrangement.

Figure 2:
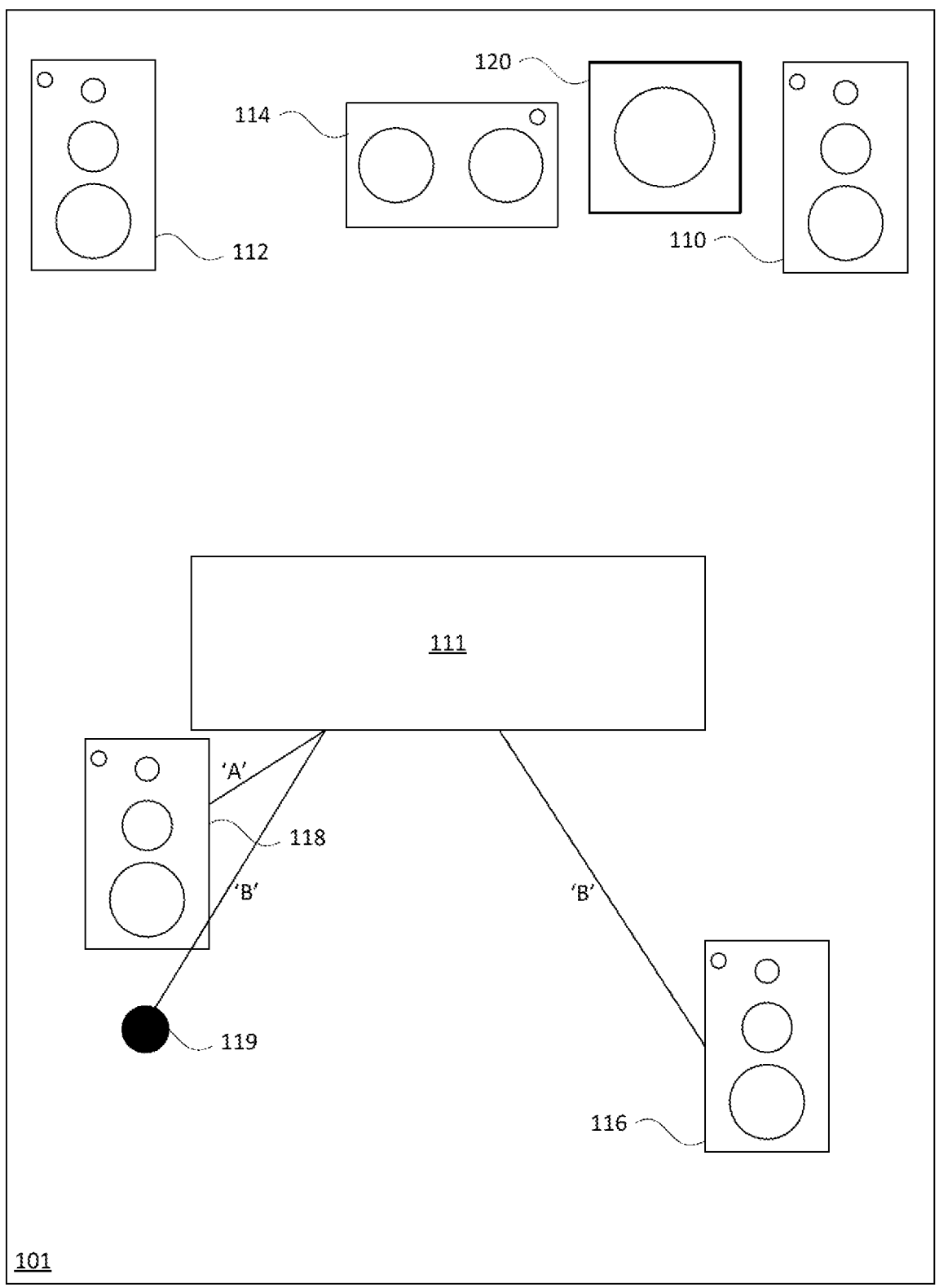
FIG. 2 is an example illustration of speaker setup for a multichannel sound system having a speaker out of position in accordance with aspects of the disclosure.

Audio content played back by a multichannel sound system where the speakers are not in the recommended arrangement may not provide listeners with a satisfactory listening experience. For example, when a speaker is missing from the recommended arrangement, an individual audio channel in the audio content may not be output by the multichannel sound system. As such, a listener may not hear all of the audio content. FIG. 2 shows an example of speakers not being in the recommended arrangement. In this regard, the rear left speaker 118 is positioned at a distance 'A' from the listening position 111. Distance 'A' is closer to the listening position 111 than distance 'B', as measured from the recommended position, shown by dot 119, to the listening position. Accordingly, the audio output from rear left speaker 118 may arrive quicker than sound from the rear right speaker 116 at distance 'B' from the listening position, which may be detrimental to audio heard by a listener. Although listening position 111 is shown as a particular area in the listening environment, the listening position 111 may be anywhere relative to the multichannel sound system.

Some multichannel sound systems may be calibrated to adjust the playback of audio content to minimize the effects of misplaced or missing speakers. For instance, calibration may include spatial calibration and compensation of audio content played back by a speaker to minimize the distortion. However, the calibration of the multichannel sound system relies on the positions of the speakers in the multichannel sound system being known. Typical speaker locating methods require user interaction during the setup and calibration of the multichannel sound system. These speaker locating routines may be technically complex and time consuming for the user. For instance, a user may be required to position one or more microphones relative to the speakers and, in some instances, perform a calibration routine. Moreover, these speaker locating routines are inflexible with respect to changes in the arrangement of the speakers. In this regard, movement of the speakers or the addition or removal of speakers typically requires the user performing additional calibration routines.

The present technology addresses these issues through a multichannel sound system that automatically performs setup and calibration. As such, no user interaction is necessary for the setup and calibration of the multichannel sound system beyond putting the speakers within a listening environment. Moreover, the automatic setup and calibration allows for easy adaptation of changing speaker placements, thereby allowing users to take advantage of wireless speaker flexibility. Additionally, the techniques described herein may allow for the measurement of speaker locations relative to the location of other speakers and/or a listener environment with high precision, such as within +/−1 inch, or more or less. In addition, the present technology monitors the position of speakers in the multichannel sound system and may again perform the automatic setup and calibration after detecting a change to the placement of a speaker.

Example Systems

FIG. 3 illustrates an example multichannel sound system 300 including a plurality of speakers 302-312 communicatively coupled, for example, over a network 350. Although five speakers are shown in FIG. 3, the multichannel sound system may include two or more speakers. The multichannel sound system may further include user devices, such as audio-video (A/V) receiver 320 and mobile phone 330. Additional user devices may include a smart television, DVD or Blu-ray Disc player, streaming video players, gaming consoles, computers, laptop's tablets, or other such components typically used to control the playback of audio/video content and/or provide the audio/content. Although FIG. 3 illustrates six speakers 302-312, a multichannel sound system may include two, three, four, five, six, seven, eight, or more speakers. The speakers of a multichannel sound system may be the same or different. For example, in the multichannel sound system 300 speakers 304-308 are the same speaker type as speaker 302 and speakers 310 and 312 are unique, as described herein. In some instances, the speakers 302-312 and/or user devices 320, 330 may be connected via wired connections, such as through speaker wire, HDMI cable, optical cables, XLR cables, etc.

Each speaker 302-312 may be configured to output audio across a range of frequencies. In this regard, each speaker 302-312 may include one or more drivers capable of producing a wide range of frequencies, such as frequencies between 20-20000 Hz corresponding to the hearing range of a typical human. In some instances, speakers may be capable of producing frequencies which are lower or higher than the typical hearing range of a human. The drivers may include tweeters, woofers, which may be referred to as mid-range drivers, subwoofers, other specialized drivers, such as co-axial drivers, horn drivers. Tweeters may output audio having frequencies in the upper range of the human hearing range, such as 2000-20000 Hz, or more or less. Woofers may output audio having frequencies in the mid-range of the human hearing range, such as 120-4000 Hz, or more or less. Subwoofers may output audio having frequencies between 20 and 200 Hz or more or less.

Figure 4A:
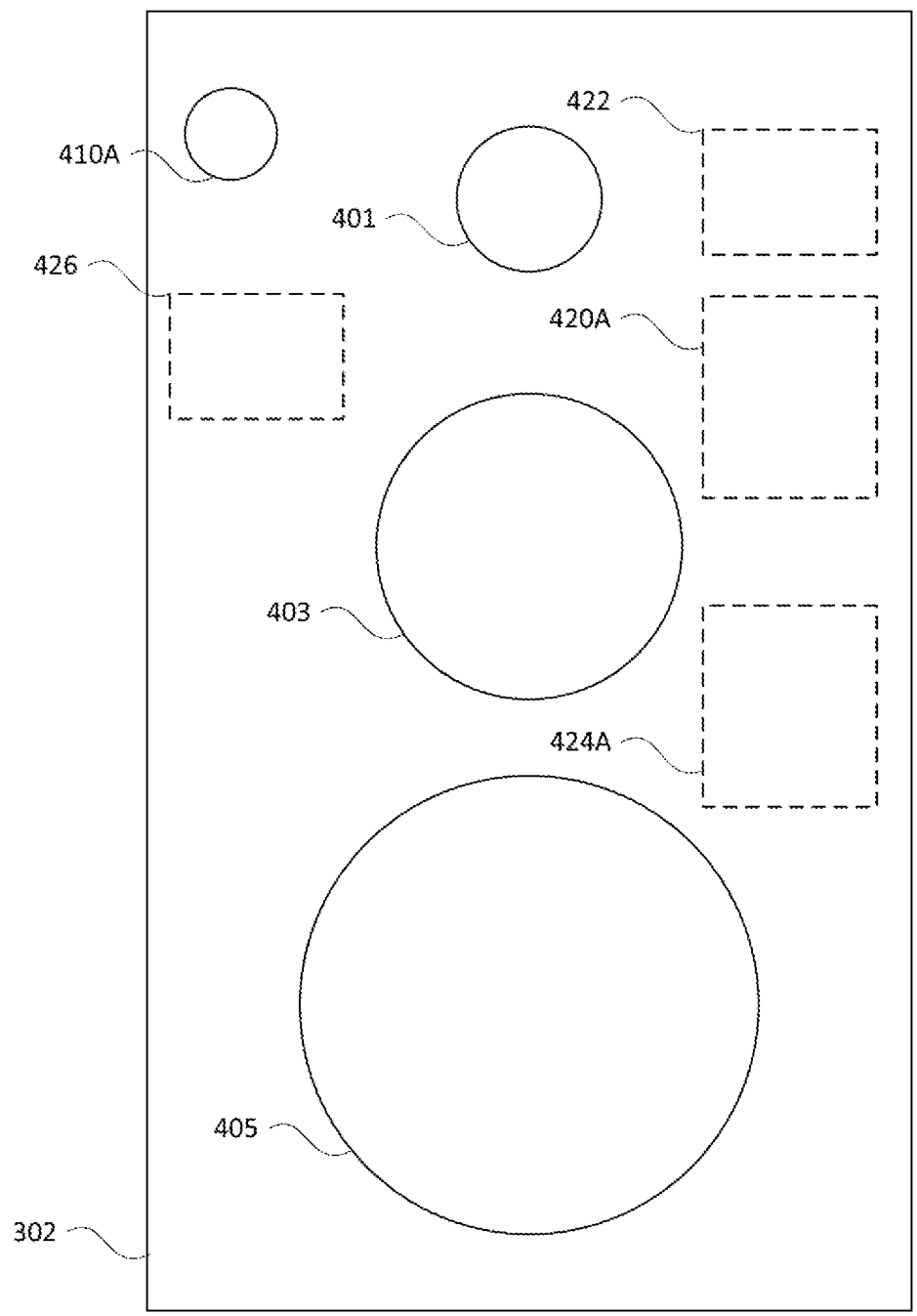
FIGS. 4A-4C are example illustrations of speakers configured in accordance with aspects of the disclosure.
Figure 4B:
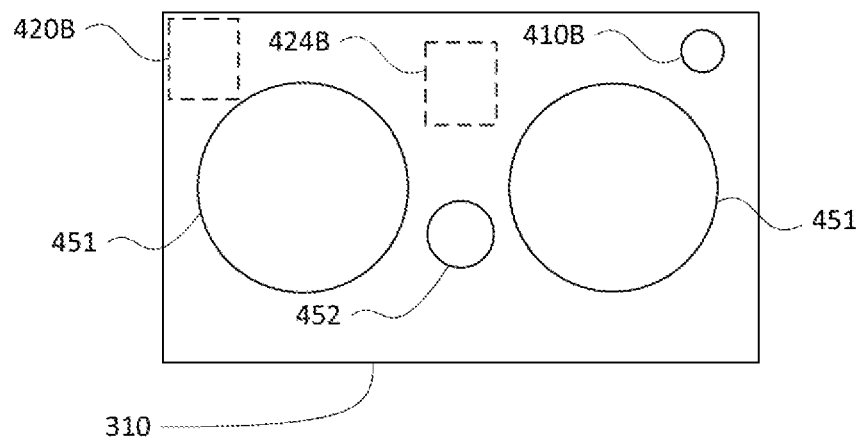
Figure 4C:
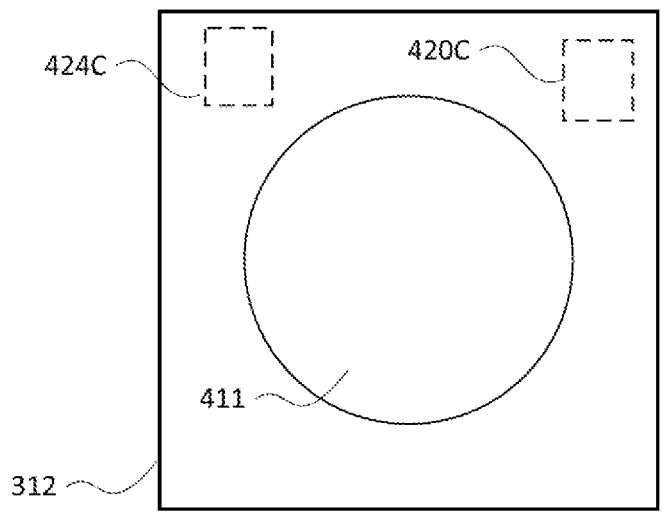

The frequency range of a speaker may be controlled by the configuration of drivers in the speaker. For instance, speaker 302 shown in FIG. 4A may include a tweeter 401, woofer 403, and subwoofer 405 capable of producing unique frequency ranges between 20-20000 Hz. Speakers having drivers configured to cover three separate, or slightly overlapping frequency ranges, such as speaker 302, may be referred to as a three-way speakers. One-way, two-way, four-way, five-way, etc., speaker configurations are also possible. For instance, speaker 310 shown in FIG. 4B is a two-way speaker and includes two woofers 451 and a tweeter 452. The woofers 451 may produce a first frequency range and the tweeter 452 may produce another frequency range. Speaker 312, shown in FIG. 4C is a one-way speaker and includes a single subwoofer 411 capable of producing only a single frequency range. One-way speakers comprised only of subwoofers covering the same frequency range are typically called subwoofer speakers.

Each speaker may include a transmitter and sensor configured to send and receive signals, respectively. The transmitters may be one or more drivers and/or other devices cable of producing and transmitting acoustical, infra-red (IR), radar, ultrasonic, or radio (RF) signals. The receivers may be any device capable of receiving the transmitted signals, such as a microphone, IR receiver, RF receiver, or ultrasonic receiver. For example, and as further shown in FIG. 4A, one or more of drivers 401-405 of speaker 302 may operate as a transmitter and microphone 410A is the receiver. In some instances, a driver, such as tweeter 452, may be a microphone. Speaker 310, shown in FIG. 4B, includes drivers 451 and 452 which may operate as the transmitter and microphone 410B may be the receiver. In some instances, a combination of transmitters and sensors may be present in a speaker. For instance, a speaker may include a driver and an IR transmitter which operate as transmitters and an IR sensor and microphone which operate as sensors. In some instances, the transmitter and sensor may be a single component capable of transmitting and receiving signals. Some speakers may not include a sensor. For example, speaker 312 shown in FIG. 4C includes driver 411 that may operate as a transmitter, but does not include a receiver 410. User devices may also include one or more transmitters.

Each speaker may be powered or passive. A powered speaker may include one or more built in amplifiers capable of providing amplified audio signals to the drivers of the speaker. For example, speakers 302, 310, and 312, as shown in FIGS. 4A-4C, are powered speakers that include amplifiers 420A, 420B, and 420C, respectively. The amplifiers 420A-420C may receive audio signals, such as line level audio signals, amplify the line level audio signals, and output the amplified audio signals to the drivers of the speakers. For instance, amplifier 420A may provide amplified audio signals to drivers 401, 403, and 405. Although speakers 302, 310, and 312 are each shown with only one amplifier 420A-420C, a speaker may include any number of amplifiers.

A passive speaker may receive amplified audio signals from one or more amplifiers located externally from the passive speaker. Such amplifiers may be within A/V receiver 320 or located in other stand-alone amplifiers. The amplified audio signals may be routed to the driver(s) of the passive speaker.

A power supply, such as power supply 422, may be configured to provide power to the components of the speaker, such as receivers 410A, 410B, transmitters, controllers 424A-424C, amplifiers 420A-420C, and any other components which may be included in each speaker. The power supply may include a battery, winding mechanism, solar cell, AC power supply, AC-DC power supply, or a combination thereof. Each speaker may have more than one power supply.

Each speaker may include a movement system to track movement of a speaker. The movement system, such as movement system 426 shown in FIG. 4A, may include a GPS, accelerometer, gyroscope and/or another motion detecting and/or tracking device for determining when a speaker is moved. By way of example only, the movement system may track movements of the speaker, such as its pitch, yaw, and/or roll, or changes thereto, relative to the direction of gravity or another such plane. In some instances, movement system 426 may track the speed and direction of movements of the speaker. In some instances, a GPS may track the location of a speaker within some confidence interval, such as 1 foot, or more or less. Movement data representative of the movement of the speaker may be provided to a controller, such as controller 424A. Based on the movement data, the controller 424A may automatically initiate a locating routine, as described herein.

Figure 5:
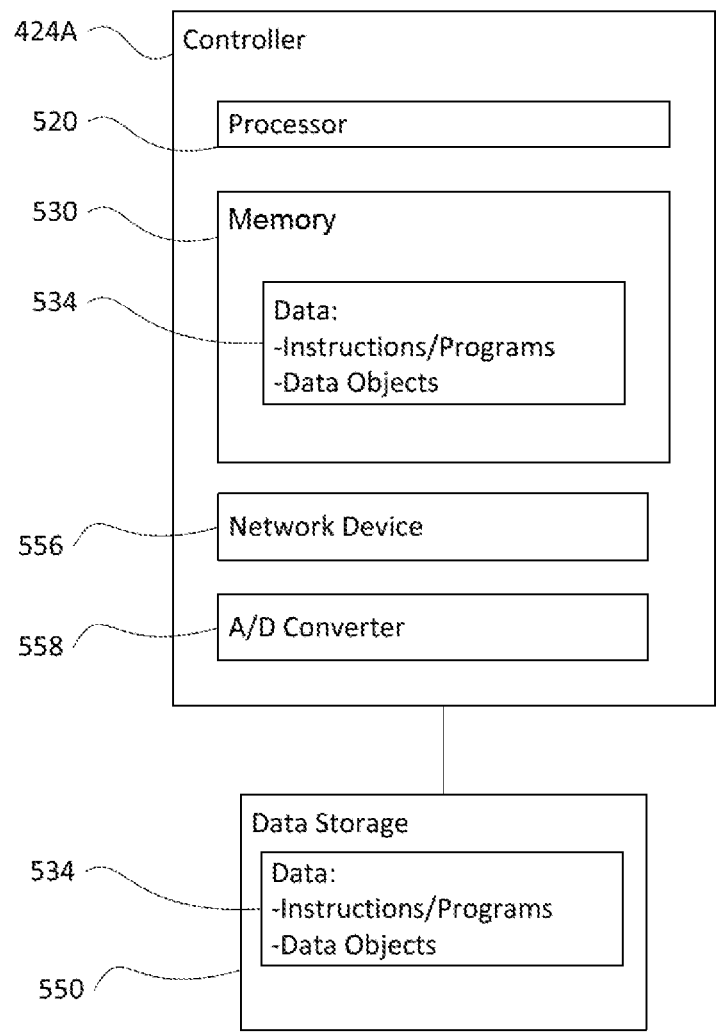
FIG. 5 is an example controller device configured in accordance with aspects of the disclosure.

Each speaker may include a controller, such as controllers 424A-424C, for performing locating routines, and in some instances, calibration of the multichannel sound system as described herein. The controllers may include one or more processors, memory, network devices, and/or a converter, such as an analog to digital convert (A/D converter). For example, controller 424A includes processor 520, memory 530, network devices 556, and A/D converter 558, as shown in FIG. 5. The processors may be a commercially available central processing unit ("CPU"), a System on a Chip ("SOC"), an application specific integrated circuit ("ASIC"), a microprocessor, a digital signal processor (DSP), or other such hardware-based processors. In some instances, a controller may include multiple processor types. For instance, a controller may include a microprocessor for performing locating and calibration as well as a discrete digital signal for processing audio signals. In some examples, speakers may include additional processors than those found in the controller. For instance, a speaker may include a DSP for processing audio signals which is distinct from the processor in the controller.

Memory, such as memory 530, may be configured to read, write, and store data 534. Memory 530 may be any solid-state or other such non-transitory type memory device. For example, memory 530 may include one or more of a hard-drive, a solid-state hard drive, NAND memory, flash memory, ROM, EEPROM, RAM, DVD, CD-ROM, write-capable, and read-only memories, or any other device capable of storing data. Data 534 may be retrieved, manipulated, and/or stored by the processor 520 in the memory 530.

Data 534 may include data objects and/or programs, or other such instructions, executable by the processor 520. Data objects may include data received from one or more components, such as user devices 320 and 330, other speakers, the processor 520, the movement system 426, the A/D converter 558, network device 556, data storage 550, etc. The programs can be any computer or machine code capable of being executed by a processor, such as processor 520, such as locating and/or calibration programs described herein. The instructions can be stored in any format for processing by a processor or in any other computing device language including scripts or modules. The functions, methods, routines, etc., of the programs for locating and calibrating a multichannel sound system are explained in more detail below. As used herein, the terms "instructions," "applications," "steps," "routines" and "programs" may be used interchangeably.

In some instances, the controller may be connected to or include one or more data storage devices, such as storage device 550. Data storage device 550 may be one or more of a hard-drive, a solid-state hard drive, NAND memory, ROM, RAM, DVD, CD-ROM, write-capable, and read-only memories, or any other device capable of storing data. The data storage device 550 may store data 534, including programs and data objects. Although FIG. 5 illustrates only a single data storage device attached to single controller 424A, any number of data storage devices may be connected to a controller and, in some instances, a data storage device may be connected to more than one controller, user devices, etc.

Each controller may include at least one network device. For instance, controller 424A includes network device 556, which may be configured to communicatively couple speaker 302 with the user devices and other speakers via the network 350. In this regard, the network device 556 may be configured to enable controller 424A of speaker 302 to communicate data, such as timing data described herein, and other such signals to other speakers and/or user devices. The network device 556 may include a network interface card (NIC), Wi-Fi card, Bluetooth receiver/transmitter, or other such device capable of communicating data over a network via one or more communication protocols, such as point-to-point communication (e.g., direct communication between two devices), Ethernet, Wi-Fi, HTTP, Bluetooth, LTE, 3G, 4G, 5G, Edge, etc., and various combinations of the foregoing.

Each controller may include an A/D converter for converting audio signals between digital signals and analog signals. For instance, A/D converter 558 may be configured to convert digital audio signal received from a source, such as user device 320 to an analog signal. The analog signal may then be output to the drivers 401-405 of speaker 302. In another example, the A/D 558 converter may convert an analog audio signal received from microphone 410A to a digital audio signal for processing by the processor 520.

The controller 424A may exchange data 534 via an internal bus (not shown), a network device 556, or other such connection, between the memory 530, data storage device 550, processor 520, A/D converter 558, or other such components. Although processor 520, memory 530, network device 556 and A/D converter 558 are shown as being within the controller 424A, these components may be located externally from the controller 424A and in communication through one or more connections, such as through the network 350.

Referring again to FIG. 3, the network 350 may include interconnected protocols and systems. The network 350 described herein can be implemented using various protocols and systems, such that the network can be part of the Internet, World Wide Web, specific intranets, wide area networks, or local networks. The network can utilize standard communications protocols, such as Ethernet, Wi-Fi and HTTP, proprietary protocols, and various combinations of the foregoing.

The user devices, including user devices 320, 330 may include some or all of the components shown in controller 424A, including a processor, memory, network device, A/D converter, and/or data storage. The user devices 320, 330 may also include other components normally used in connection with a computing device such as displays, input devices, such as touch screen 331, buttons and knobs 321, a mouse, keyboard, microphone, etc. The processors of the user devices can be capable of executing programs, such as locating and/or calibration programs described herein. In some instances, each speaker may include these other components, such as displays, input devices, etc.

Each controller and/or user device may be capable of operating as a master or secondary device. In this regard, the master device may control the operation of the some or all of the functions of the multichannel sound system 300. For instance, the master device may control the locating and/or calibration routines as described herein. In some instances, more than one controller and/or user device may be the master device. For instance, user device 330 and controller 424A may both be capable of functioning as the master device for controlling the locating routine. The other controllers and/or user devices may be secondary devices which perform their portion of the locating routine based on instructions and/or signals received from the master device. In some instances, a speaker may be controlled by a controller in another device. For example, speaker 302 may not include a controller, but may be controlled by a controller in A/V receiver 320.

Example Methods

Figure 6:
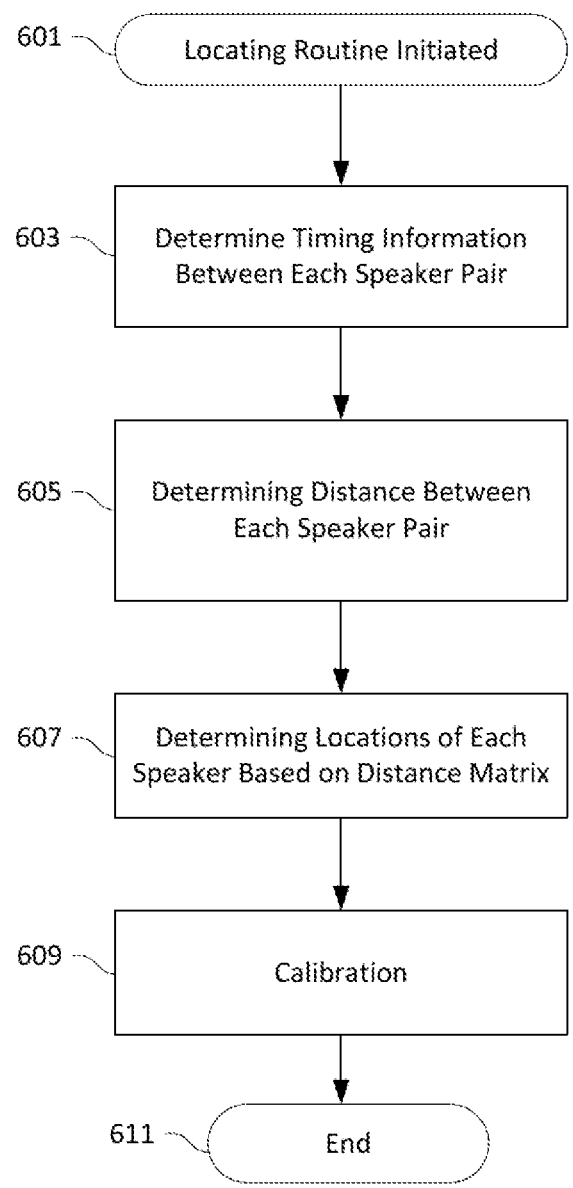
FIG. 6 is an example flow diagram in accordance with aspects of the disclosure.

FIG. 6 illustrates a flow chart 600 showing a process for locating and calibration of a multichannel sound system, such as multichannel sound system 300 positioned in listening environment 701. As shown in block 601, a locating routine is initiated by a master device, which may be one of the controllers or user devices. For the example provided herein, controller 424A of speaker 302 is the master device, but any other controller or user device may also be configured to be the master device. Initiation of the locating routine may be initiated manually by a user or automatically by the controller 424A as the master device. For instance, upon adding a new speaker, rearranging the position of a speaker, powering on one or more of the speakers, etc., of a multichannel sound system 300 the controller 424A may automatically execute the locating and/or calibration routine. In some instances, the controller 424A may provide a prompt to a display on a speaker and/or a user device, such as user device 330. The prompt may request user input whether the locating and/or calibration routine should be performed. In some instances, a user may manually instruct controller 424A to run the locating routine. The user may provide the instructions to controller 424A as the master device through a user device, such as touch screen 331 on user device 330 or buttons 321 on user device 320, through an interface on one or more of the speakers in the multichannel sound system.

As explained above, initiation of the locating routine may be automatically initiated by the controller 424A. In this regard, controller 424A may monitor the location of each speaker (302-312) of the multichannel sound system 300 as well as the number of speakers in the multichannel sound system 300 and initiate the locating routine after detecting a change. For example, after detecting the removal or addition of a speaker to the multichannel sound system 300, the controller 424A may initiate the locating routing. In another example, the controller 424A may detect a change to the positioning of a speaker, such as by tracking movement data received from each movement system in the speakers. For instance, after controller 424A receives position data from the controller of speaker 306 indicating that speaker 306 was moved from location 719 to location 718, controller 424A may automatically initiate the locating routine.

As shown in block 603, after initiation of the locating routine, time of flight measurements between pairs of speakers may be performed. Time of flight measurements may be performed between each speaker pair to determine the time of flight between each speaker. The time of flight measurements may be done sequentially or in parallel. Sequential measurements may include performing a time of flight measurement between each speaker, one pair at a time, until the time of flight between each pair of speakers in the multichannel sound system 300 has been determined. For example, time of flight measurement between speaker 302 and 304 may be performed, followed by time of flight measurements between speaker 302 and speaker 306, speaker 302 and speaker 308, speaker 302 and speaker 310, and finally between speaker 302 and speaker 312. Sequential measurements may then be done for the other pairs of speakers until the time of flight measurement between each pair of speakers in the multichannel sound system 300 are determined. In other words, time of flights measurements may be performed between speakers 304 and 306, 304 and 308, 304 and 310, 304 and 312, 306 and 308, 306 and 310, 306 and 312, 308 and 310, 308 and 312, and 310 and 312.

Parallel measurements may include performing a time of flight measurement between a first speaker and two or more of the other speakers in the multichannel sound system simultaneously. For example, time of flight measurements between speaker 302 and speakers 304-312 may be performed simultaneously by speaker 302 emitting a single signal to speakers 304-312 at the same time. Similar time of flight measurements may be performed for each of the other speakers. For instance, time of flight measurements between speaker 304 and speakers 306-312, speaker 306 and speakers 308-12, etc.

The foregoing order of time of flight measurements is simply for illustration purposes and the time of flight measurements between speaker pairs may occur in any order. For instance, time of flight measurements between speaker 302 and 312 may occur before the time of flight measurement between speaker 302 and 306 or time of flight measurements between speaker 306 and 308 may occur before the time of flight measurement between speaker 302 and 304. Although the foregoing example excludes a time of flight measurement occurring more than once between speakers 302 and 304, the time of flight measurements between pairs of speakers may occur multiple times to increase accuracy and consistency with the measurements, as well as correct for potential time of flight measurement errors (e.g., missed signals, noisy signals, etc.). Although the example time of flight measurements described herein are between speakers, time of flight measurements between a user and/or user device, such as user device 320 or 330, and one or more of the speakers and/or other user devices in the multichannel sound system may also be determined. In this regard, the user device may be positioned in a listening position, such as user device 330 in listening position 711. As such, the calibration of the multichannel sound system can take into account the listening position relative to the position of the speakers. In some instances, the user device may be positioned outside of listening position 711. In another example, a user may be positioned in the listener position 711 and a sensor, such as one or more of an optical, IR, vapor, ultrasonic, motion, radar, may determine the location of the user.

Time of flight measurements between some pairs of speakers may be omitted. For instance, time of flight measurements between the subwoofer 312 and the other speakers (e.g., 302-310) may be omitted, as the perceived location of the low frequency sounds output by the subwoofer 312 may not be easily detected. As a result, positioning of the subwoofer 312 relative to the other speakers may not affect the operation of the multichannel sound system. In some instances, such as when locating and calibration is performed due to the movement and/or addition of a speaker to the multichannel sound system, only a subset of the time of flight measurements between the moved or added speaker may be required. In this regard, time of flight data previously captured between previously positioned speakers in the multichannel sound system may be reused. In some instances, time of flight measurements may be supplemented or replaced by manually entered or preprogrammed location data. For instance, a location of one or more of the speakers may be manually input. In another example, the location of two or more drivers of a speaker may be at known locations, such as two drivers at opposite ends of a sound bar. The drivers may be considered two individual speakers, and the known distance between these drivers may be preprogrammed such that it is stored in the memory, such as memory 530, and/or storage device, such as data storage 550 for locating and calibration.

Figure 8:
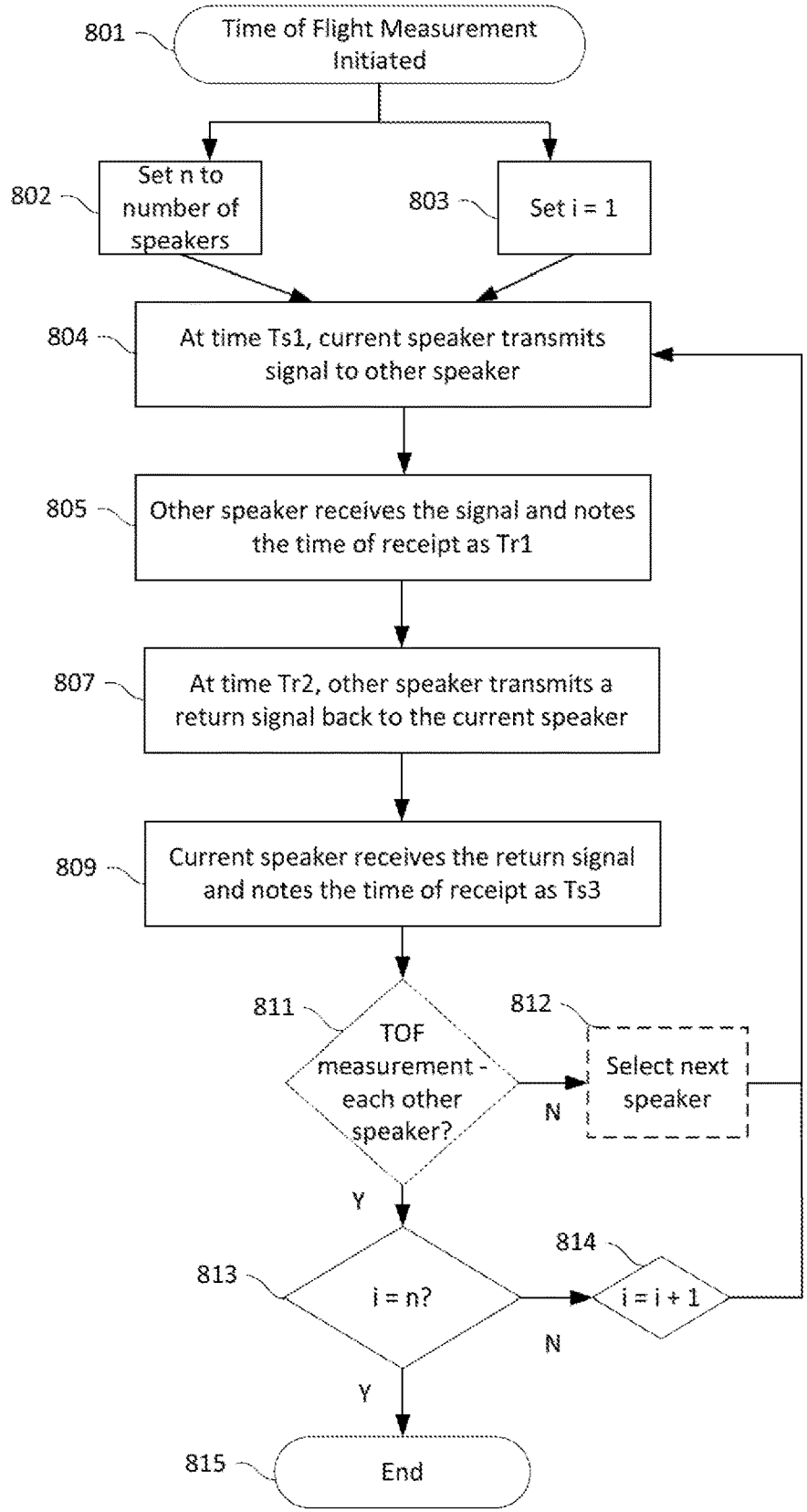
FIG. 8 is an example flow diagram in accordance with aspects of the disclosure.

FIG. 8 illustrates a flow chart 800 showing a process for performing time of flight measurements between pairs of speakers. As shown in block 801, the time of flight measurement may be initiated, and controlled throughout, by the master device, such as controller 424A. Upon initiating the time of flight measurement variable 'n' representative of the number of speakers for which time of flight measurements need to be performed may be set, as shown in block 802. For example, multichannel sound system 300 may include 6 speakers, so 'n' may be set to 6. A variable, 'i' representative of the number of speakers which have had time of flight measurements performed may be set to 1, as shown at block 803. The controller 424A, as the master device, may determine the speaker for which the time of flight measurements are to be performed, referred to as the current speaker. For example, when 'i' is 1, controller 424 may set speaker 302 as the current speaker. As mentioned herein, the order of time of flight measurements discussed herein is simply for illustration purposes and the time of flight measurements between speaker pairs may occur in any order.

The transmitter of the current speaker (e.g., speaker 302) may transmit a signal at time Ts1, as shown in block 804. In this regard, the current speaker may transmit the signal to the other speaker forming the speaker pair, in the multichannel sound system. To account for internal delays within the speaker between the time Ts and the actual transmission of the signal, the microphone or other receiver of the speaker may detect the time the transmission of the signal at time Ts2. Times Ts1 and Ts2 may be recorded in memory, such as memory 530. Time Ts1 and Ts2 may be based on the clock of the processor 520, controller 424A, or another clock associated with the current speaker.

As mentioned herein, the time of flight measurements may be performed sequentially or in parallel. For instance, when performing the time of flight measurements sequentially, the transmitter of speaker 302, as the current speaker, may transmit the signal to speaker 310 as the other speaker of the speaker pair. When performing the time of flight measurements in parallel, the transmitter of speaker 302 may transmit the signal to the other speakers 304-312 simultaneously, with each other speaker forming a respective speaker pair with speaker 302. The controller 424, as the master device, may determine and control whether the time of flight measurements are performed sequentially or in parallel and instruct the devices in the multichannel sound system accordingly.

By performing time of flight measurements in parallel the transmitted signals required for each speaker to perform time of flight measurements may be the same as the number of speakers in the multichannel sound system. In other words, a multichannel sound system having five speakers may only require five transmitted signals, where the transmitted signals are the signals sent from the current speakers to the other speakers simultaneously for time of flight measurement. In some instances, the number of transmitted signals may be greater than the number of speakers in the multichannel sound system or fewer than the number of speakers in the multichannel sound system.

The transmitted signal by the current speaker may be any signal capable of being received by the other speakers. For instance, the transmitted signal may be an acoustical signal output by one or more drivers of the speaker, such as a maximum length sequences (MLS) signal or an acoustical signal with peaked autocorrelation, which may be more pleasant sounding to a listener than a MLS signal. In some instances, the transmitted signal may be an IR, RF, and/or ultrasonic signal output by an IR transmitter, RF transmitter, and/or ultrasonic receiver. In some instances, the transmitted signal may be embedded into source material, such as music, or the transmitted signal may be source material. In some instances, other sources located at the position of the current speaker can be used to transmit the signal. For instance, a user may use their voice or clap to generate a sound signal. Similarly, for instances where a user device or user of the system is being subjected to time of flight measurements, the user or other item may generate the sound.

As shown in block 805, a receiver 410B on the other speaker (e.g., speaker 310) in the speaker pair receives the signal transmitted by the current speaker 302. In this regard, the receiver 410 may be a microphone to detect an audio signal, an IR receiver to detect an IR signal, an ultrasonic receiver to detect an ultrasonic signal, and/or an RF receiver to detect an RF signal. The time of receipt of the signal by the other speaker, Tr1, may be recorded and stored in memory by either the controller 424B of the other speaker or transmitted to another controller, user device, data storage device, etc. When time of flight measurements are being performed in parallel, time Tr1 may be different for each other speaker depending on their respective distance from the current speaker. Time Tr1 may be based on the clock of the processor, controller, or other clock associated with the other speaker. In this regard, the clock of the other speaker may be the same or different than the clock of the current speaker.

The transmitter of the other speaker transmits a return signal back to the current speaker, as shown in block 807. The time of transmission of the return signal by the transmitter of the other speaker may occur a period of time, Tr2, after the time of receipt of the signal by the other speaker, Tr1. Tr2 may be recorded and stored in memory. Time Tr2 may be different for each other speaker. The clock of the current speaker and the clock of the other speaker may be configured to run at the same rate to increase the accuracy of the timing data between the clock of the current speaker and the other speaker. To account for internal delays within the other speaker between the time Tr1 and the actual transmission of the return signal, the microphone or other receiver of the other speaker may detect the time the transmission of the return signal at time Tr3. Time Tr3 may be recorded and stored in memory.

The receiver 410A of current speaker 302 may detect the return signal, as shown in block 809. The time, Ts3, the return signal is detected by the receiver 410A of the current speaker may be recorded and stored in memory.

The transmitted signal and/or the return signal may have a peaked autocorrelation characteristic and a predefined duration. The received signal (e.g., the transmitted signal or return signal) may be weak relative to when it was transmitted, as it may have traveled across a large room. As such, the output of the receiver (e.g., data received by the receiver) may have local peaks, which may not be actual indications of the received signal. To detect the real peaks in the received signal, that is the peaks caused by the transmitted signal or return signal, the transmitted signal or return signal may be sent multiple times, such as four or more times, or more or less. A controller, such as controller 424A, may determine a peak in the received signal and then another peak in the signal a predefined duration later. In some instances, a third peak may be determined another predefined duration after the second peak is determined. To determine a valid first peak, the controller 424A may determine whether the first, second, and third peaks are detected at the signal duration interval.

In some instances, reflections such as caused by the transmitted and/or return signal bouncing off of walls, furniture, and objects in the listening space may result in the receiver detecting many instances of the same signal. In this regard, the direct path of the transmitted and/or return signal may be occluded, and the first signal may not be as strong as subsequent clean reflected signals. In order to detect the direct path, after a peak is detected a search may be done for earlier, smaller peaks which may be indicative of an occluded direct path. As there are variations on the signal reception and therefore the peak detector output, there may be some tolerance when checking for the three peaks. The largest peaks may be kept for each search window and searches may be done through the set of largest peaks with increasing tolerance up to a preset limit to find the strongest set of peaks, but not miss weaker signals. As detection of the signal when it first reaches the speaker provides greater distance accuracy, preference may be given to earlier peaks, even if they are slightly weaker than later peaks.

A confidence measure may be assigned to a detected signal's presence in a given window to leverage the peaked autocorrelation of the transmitted or returned signal. In this regard, a four-bin histogram, or more or less, of the received signal may be maintained by the controller to determine whether a received signal is present. In this regard, there may be few samples in the highest quartile, as the received signal may be normalized as it is processed, so peaks may suppress the magnitude of non-peak signals.

In some instances, the window may not be aligned with the signal it is trying to detect. As such, given that the controller is looking at the correlation, in some cases the first detected peak may actually be the second detected peak or another later detected peak. In order to account for this scenario, the detection of peaks may be performed again on the data from a window that is one window prior to the detected time. In the event there is a signal in this window it will have a peak at a known point early in the window that is one window prior to the detected time, within some margin of time.

In instances where the signal is detected at the end of the window, a check may be performed for peaks which are at the beginning. In other words, the received signal may "wrap" around a window. This scenario may occur because the detection of a signal is run over a window and is not aligned with the actual received signal.

During sequential time of flight measurements, the time of flight measurement for another speaker relative to the current speaker may be initiated by the controller 424A, as the master device. In this regard, the controller 424A may determine whether a time of flight measurement for any remaining speakers in the multichannel sound system relative to the current speaker needs to be taken, as shown in block 811. In the event there are remaining speakers, the controller 424A may select one of the remaining speakers as the other speaker, as shown in block 812. Blocks 804-812 may be continually executed until a time of flight measurement between all of the speakers in the multichannel sound system and the current speaker are performed. As mentioned herein, a time of flight measurement between a pair of speakers may occur once or more than once between a pair of speakers. For example, when speaker 302 is the current speaker a time of flight measurement between current speaker 302 and other 304 may occur. When speaker 304 is the current speaker, another time of flight measurement between current speaker 304 and other speaker 302 may or may not occur. The controller 424A, as the master device may control whether multiple time of flight measurements between speaker pairs should occur.

During parallel time of flight measurements blocks 811 and 812 may not be performed, as all time of flight measurements for the speakers in the multichannel sound system relative to the current speaker are executed simultaneously.

After the controller 424A determines that time of flight measurements for all speakers in the multichannel sound system relative to the current speaker 302 have been taken, as shown in block 811, the controller 424A may determine whether variable 'i' is the same as variable 'n' as shown in block 811. In the event 'i' equals 'n', no further time of flight measurements between speaker pairs may be necessary and the time of flight measurement process may end, as shown in block 815. In the event 'i' does not equal 'n', the value of 'i' may be increased by 1, as shown in block 814, which may cause the controller to select another current speaker. Steps 804-814 may be repeated until 'n' equals 'i', which indicates that time of flight measurements for all speakers in the multichannel sound system relative to the other channels in the multichannel sound system may have been performed.

Although flow chart 800 shows the controller relying on variables 'n' and 'i' to determine the current speaker and progress through the time of flight measurements for speaker pairs, other techniques for tracking progress of the time of flight measurements between speaker pairs may be used. In this regard, the reliance on variables 'n' and 'i' by the controller 424A as the master device is one way for the controller 424A to control the gathering of the time of flight measurements and is provided only for illustration purposes. Many other techniques for controlling the gathering of the time of flight measurements between speaker pairs may be used. For instance, the controller 424A may execute an application which controls the time of flight measurements between speaker pairs according to a certain order.

Referring back to FIG. 6, the distance between each speaker pair may be determined based on the time of flight measurements, as shown in block 605. The distance calculations may be performed by one or more controllers, such as controller 424A, or one or more user devices, such as mobile phone 330 or A/V receiver 320. For example, controller 424A may receive all of the recorded times (e.g., Ts1, Ts2, Ts3, Tr1, Tr2, Tr3) for each speaker pair. Based on these recorded times, the distance between each speaker pair may be calculated and processing delays which may have occurred between transmitting and receiving the signal and the return signal may be accounted for. In instances, where time of flight measurements for user devices relative to speakers have been performed, the distance between the user devices and speakers may be determined. The distance between each speaker relative to other speakers and/or user devices in the multichannel sound system may be input into a distance matrix. In some instances the recorded times may be measured in samples, so the distance function may be a function of the sample rate. The distance between each speaker may be calculated as follows:

$DTs=(Ts3-Ts1)-(Ts2-Ts1)=Ts3-Ts2$, where $DTs$ is the time the current speaker waited for the return signal; (i)

$DTr=(Tr2-Tr1)+(Tr3-Tr2)=Tr3-Tr1$, where $DTr$ is the time the other speaker took to respond to the transmitted signal; (ii)

$Trt=DTs-DTr$, where $Trt$ is the round-trip time; and (iii)

$Distance=(Trt/2)*SpeedOfSound.$ (iv)

As shown in step 607, the locations of each speaker in the multichannel sound system relative to the other speakers, and in some instances, user devices, may be determined from the distance matrix. For instance, the distance matrix may be a symmetrical square Matrix, where $M(i, j)$=distance from speaker i to speaker j. Some of these distances may be fixed, such as distances detected or otherwise measured between drivers in advance (e.g., the distance between a pair of drivers in a soundbar) while other distances are detected as described herein. The relative coordinates between the speakers in a multichannel sound system may be determined from the symmetrical square Matrix as follows:

(i) speaker one is considered at coordinates (x, y, z) (0, 0, 0);

(ii) speaker two is considered at coordinates (x, y, z)= (distance(sp0, spk1), 0, 0), where spk0 is the first speaker and spk1 is the second speaker;

(iii) speaker three is considered at coordinates (x, y, z)=(u, v, 0), in the same horizontal or vertical plane as the first two speakers.

The other speakers in the multichannel sound system may have unknown three-dimensional coordinates which may be determined in relation to the first three speakers.

The first three speakers may be anchored in a location, such as a listening environment. For instance, speaker one may be anchored as a center-left speaker, speaker two may anchored as a center-right speaker, and speaker three may be anchored as a horizontal speaker located in the center front part of a soundbar or in the same plane as a TV. The coordinates may then be determined relative to relative to the TV or the soundbar. Eigen Singular Value Decomposition (SVD) can be used to obtain the speaker coordinates, as follows:

(i) Square the distances in the matrix;

(ii) Subtract, per row, the average value of that row;

(iii) Subtract, per column, the average value of that column;

(iv) Divide the matrix by −2.0; and (v) Calculate the singular values of the matrix and create a diagonal matrix S with these singular values.

S, U, and V matrices may be generated where M=U*S*V. V, with the transforms performed above, may be U transposed. An X matrix may be generated which includes the 3D coordinates for all speakers relative to each other, in an (3×num_speakers) coordinate matrix, where num_speakers is the number of speakers being located. The X matrix may be determined as follows:

$X=\text{Sqrt}(S)*U$ transposed

In some instances, Eigen SVD may be subjected to minor distance errors in the original matrix. As a result, Eigen SVD may create the X matrix where the distances between the points generated are slightly different compared to the original distance matrix M. To address these minor distance errors pairs of points in the X matrix may be chosen where the distance error compared to M is larger than a percentage of the original M distance. A three-dimensional line equation between the two points may be determined. Based on the determined three-dimensional line equation, the two points may be moved closer together or farther apart on the line, to minimize the error compared to the original M distance matrix. This process may be repeated for the next largest distance error, until all distances are within an error percentage.

Once all distances are within an error percentage, the final X coordinate matrix may be completed. The X matrix may be rotated and translated such that the first speaker has coordinates at (0, 0, 0), the second speaker has coordinates at (a, 0, 0), and the third speaker has coordinates at (b, c, 0) and the rest of the 3D coordinates for the other speakers may then be determined.

In another example, a gradient descent algorithm may be used to determine the relative locations of the speaker in the multichannel sound system. In this regard, the two reference points (0, 0, 0) and (a, 0, 0) may be calculated from the distance matrix. A third point may be initialized to (1, 1, 0) and all the other points may be initialized to (1, 1, 1). The gradient descent algorithm may then adjust all the non-zero coordinates by a small amount each iteration until the distances between all the previously calculated points and the new point on which gradient descent is being run on are as close as possible to the distances in the original distance matrix. The gradient descent algorithm may be run starting from the third point, until all points have stable coordinates and their resulting distance matrix is very close to the original distance matrix.

The error between the distances in the original distance matrix and the values determined by the gradient descent algorithm may be calculated inside a cost function that the gradient descent algorithm attempts to minimize by adjusting each non-zero coordinate by a learning rate alpha multiplied by the partial derivative of the cost function for that coordinate, across many iterations. If the cost function stops decreasing or decreases very slowly over a few iterations, a minimum may have been reached and the gradient descent algorithm may be stopped. If the cost still has a high value, it may indicate the original distance measurements had too high of an error. To correct this, the time of flight measurements may be performed again and the distance matrix updated with the new distance values. Depending upon the number of speakers and/or user devices for which distances are determined, the positioning of the speakers in a 3-D space relative to the user devices and other speakers may be determined and may include an elevation (e.g., height) dimension relative to the other speakers and/or user devices.

Figure 7:
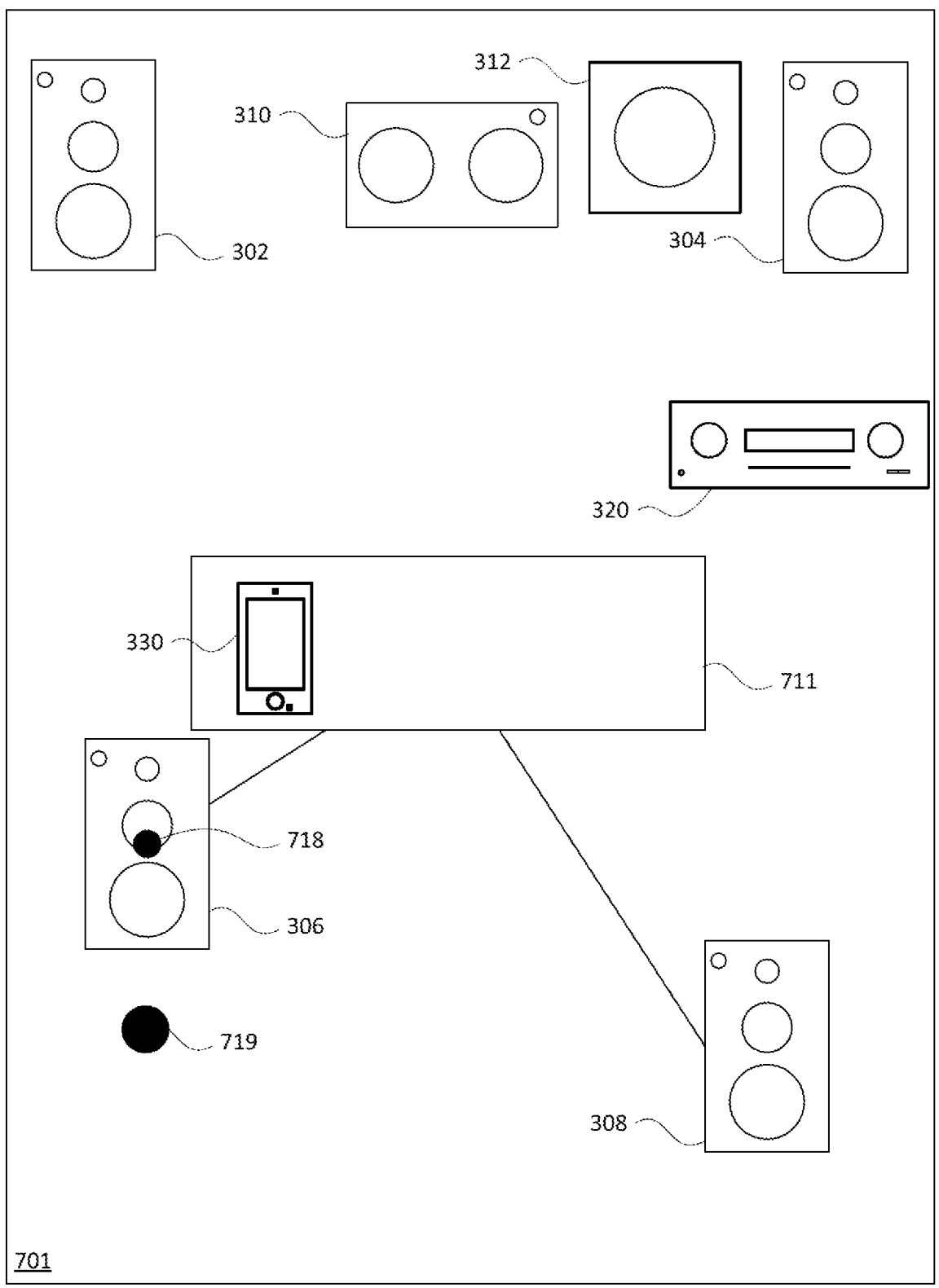
FIG. 7 is an example illustration of speaker setup for a multichannel sound system having a speaker out of position in accordance with aspects of the disclosure.

Calibration of the multichannel sound system 300 may be performed based on the known locations of the speakers in the multichannel sound system, as shown in block 609. Calibration may be performed by one or more controllers, such as controller 424A and/or a user device, such as user device 320 or 330. In some instances, calibration may be performed in real-time by one or more DSP in the user devices and/or speakers. Calibration may include adjusting the spatial calibration and/or otherwise compensation of audio content played back by a speaker to minimize distortions introduced by speakers placed outside of a recommended position, such as speaker 306 in FIG. 7.

Additionally, calibration may provide for accurate reproduction of audio content at a listening position by tuning the delay of audio output of each speaker relative to the other speakers and/or controlling which portions of the audio content is output by the speakers. For instance, the volume of a speaker may be adjusted to account for changes in placement. In another example, the waveform (e.g., the audio content to be played by a speaker) may be delayed to adjust for change in distance. In some examples, the audio content sent to multiple speakers may be remixed to compensate for new locations. In another example, the audio content sent to one or more speakers may be altered psychoacoustically to give the impression that sound is coming from a location where there is no speaker. For example, if the source material is designed for height speakers, yet none are present (as determined by this technology) the system can modify the audio content to create a virtual height. Similar manipulation of the audio content can be used to create the perception of speakers behind the listener when none are present. Upon completion of calibration, the locating and calibration process may be complete, as shown by block 611 in flow chart 600.

In some instances, if the polarity of a speaker is reversed, the phase of the sound waves emitted by the speaker will be inverted. This can be detected and corrected by accounting for the polarity reversal in the playback of a waveform at that speaker. Similarly, if a speaker is connected to the wrong output, e.g., a rear left speaker is connected to the front center, this can be detected and corrected by sending the correct audio to the incorrectly connected speaker.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for determining speaker positioning in a multichannel sound system, the method comprising:
   performing, by one or more controllers, time of flight measurements between one or more pairs of speakers of a plurality of speakers;
   determining, by the one or more controllers, a distance between each of the one or more pairs of speakers based on the time of flight measurements;
   determining, by the one or more controllers, a location of each speaker in the one or more pairs of speakers relative to other speakers in the one or more pairs of speakers based on the time of flight measurements, the location including an elevation and a distance of each speaker relative to the other speakers in the one or more pairs of speakers; and
   calibrating the multichannel sound system based on the determined location of each speaker.

2. The method of claim 1, further comprising:
   performing additional time of flight measurements between one or more speakers of the plurality of speakers and a user device; and
   determining a distance between each of the one or more speakers and the user device based on the additional time of flight measurements,
   wherein determining the location of each speaker in the one or more pairs of speakers relative to the other speakers in the one or more pairs of speakers further includes determining the location of each speaker in the one or more pairs of speakers relative to the user device.

3. The method of claim 2, wherein the user device is located in a listening position when the time of flight measurements are performed.

4. The method of claim 1, wherein performing the time of flight measurements between one or more pairs of speakers includes:
   for each pair of speakers, transmitting a signal from a first speaker in the pair of speakers to a second speaker in the pair of speakers at a first time;
   receiving, by the second speaker, the transmitted signal at a second time;
   transmitting, by the second speaker, a return signal to the first speaker at a third time; and
   receiving, by the first speaker, the return signal at a fourth time.

5. The method of claim 4, further comprising:
   detecting, by a receiver of the first speaker, the transmitted signal from the first speaker to the second speaker at a fifth time; and
   detecting, by a receiver of the second speaker, the return signal from the second speaker to the first speaker at a sixth time,
   wherein determining the distance between each of the one or more pairs of speakers based on the time of flight measurements includes determining the distance based on the respective first, second, third, fourth, fifth, and sixth time of the pairs of speakers.

6. The method of claim 4, wherein the transmitted signal and/or the return signal is transmitted by one or more of a driver, IR transmitter, RF transmitter, or ultrasonic receiver.

7. The method of claim 4, wherein the transmitted signal and/or the return signal is received by one or more of a microphone, IR receiver, RF receiver, or ultrasonic receiver.

8. The method of claim 4, wherein the transmitted signal and/or the return signal are a maximum length sequence signal.

9. The method of claim 4, wherein the transmitted signal and/or the return signal have peaked autocorrelation.

10. The method of claim 4, wherein the transmitted signal and/or the return signal is embedded into an audio signal.

11. The method of claim 1, wherein the distance between each of the one or more pairs of speakers is input into a distance matrix and determining the location of each speaker in the one or more pairs of speakers relative to the other speakers in the one or more pairs of speakers includes using Eigen decomposition and/or gradient descent of the distance matrix.

12. The method of claim 1, further comprising:
prior to performing the time of flight measurements between the one or more pairs of speakers of the plurality of speakers, receiving an indication that a speaker in the plurality of speakers has been moved and/or removed; and
upon detecting the speaker in the plurality of speakers has been moved and/or removed, performing the time of flight measurements between the one or more pairs of speakers of the plurality of speakers.

13. A system for determining speaker positioning in a multichannel sound system, the system comprising:
a plurality of speakers, wherein each speaker of the plurality of speakers includes at least one transmitter and at least one receiver; and
one or more processors, wherein the one or more processors are configured to:
perform time of flight measurements between one or more pairs of speakers of the plurality of speakers;
determine a distance between each of the one or more pairs of speakers based on the time of flight measurements;
determine a location of each speaker in the one or more pairs of speakers relative to the other speakers in the one or more pairs of speakers based on the time of flight measurements, the location including an elevation and a distance of each speaker relative to the other speakers in the one or more pairs of speakers; and
calibrate the multichannel sound system based on the determined location of each speaker.

14. The system of claim 13, wherein the one or more processors are further configured to:
perform additional time of flight measurements between one or more speakers of the plurality of speakers and a user device; and
determine a distance between each of the one or more speakers and the user device based on the additional time of flight measurements,
wherein determining the location of each speaker in the one or more pairs of speakers relative to other speakers in the one or more pairs of speakers further includes determining the location of each speaker in the one or more pairs of speakers relative to the user device.

15. The system of claim 14, wherein the user device is located in a listening position when the time of flight measurements are performed.

16. The system of claim 13, wherein performing the time of flight measurements between one or more pairs of speakers includes:
for each pair of speakers, transmitting a signal from a first speaker in the pair of speakers to a second speaker in the pair of speakers at a first time;
receiving, by the second speaker, the transmitted signal at a second time;
transmitting, by the second speaker, a return signal to the first speaker at a third time; and
receiving, by the first speaker, the return signal at a fourth time.

17. The system of claim 16, wherein determining the distance between each of the one or more pairs of speakers based on the time of flight measurements includes determining the distance based on the respective first, second, third, and fourth time of the pairs of speakers.

18. The system of claim 13, wherein the at least one transmitter is one or more of a driver, IR transmitter, RF transmitter, or ultrasonic receiver.

19. The system of claim 13, wherein the at least one receiver is one or more of a microphone, IR receiver, RF receiver, or ultrasonic receiver.

20. The system of claim 16, wherein the transmitted signal and/or the return signal are a maximum length sequence signal.

21. The system of claim 16, wherein the transmitted signal and/or the return signal have peaked autocorrelation.

22. The system of claim 16, wherein the transmitted signal and/or the return signal is embedded into an audio signal.

23. The system of claim 13, wherein the distance between each of the one or more pairs of speakers is input into a distance matrix and determining the location of each speaker in the one or more pairs of speakers relative to the other speakers in the one or more pairs of speakers includes using Eigen decomposition and/or gradient descent of the distance matrix.

24. The system of claim 13, wherein the one or more processors are further configured to:
prior to performing the time of flight measurements between the one or more pairs of speakers of the plurality of speakers, receiving an indication that a speaker in the plurality of speakers has been moved and/or removed; and
upon detecting the speaker in the plurality of speakers has been moved and/or removed, performing the time of flight measurements between the one or more pairs of speakers of the plurality of speakers.

25. A non-transitory computer-readable medium storing instructions, which when executed by one or more processors, cause the one or more processors to:
perform time of flight measurements between one or more pairs of speakers of the plurality of speakers;
determine a distance between each of the one or more pairs of speakers based on the time of flight measurements;
determine a location of each speaker in the one or more pairs of speakers relative to the other speakers in the one or more pairs of speakers based on the time of flight measurements, the location including an elevation and a distance of each speaker relative to the other speakers in the one or more pairs of speakers; and
calibrate the multichannel sound system based on the determined location of each speaker.

26. The non-transitory computer-readable medium of claim 25, wherein the instructions further cause the one or more processors to:

perform additional time of flight measurements between one or more speakers of the plurality of speakers and a user device; and determine a distance between each of the one or more speakers and the user device based on the additional time of flight measurements, wherein determining the location of each speaker in the one or more pairs of speakers relative to other speakers in the one or more pairs of speakers further includes determining the location of each speaker in the one or more pairs of speakers relative to the user device.

27. The non-transitory computer-readable medium of claim 25, wherein performing the time of flight measurements between one or more pairs of speakers includes:

for each pair of speakers, transmitting a signal from a first speaker in the pair of speakers to a second speaker in the pair of speakers at a first time;

receiving, by the second speaker, the transmitted signal at a second time;

transmitting, by the second speaker, a return signal to the first speaker at a third time; and receiving, by the first speaker, the return signal at a fourth time.

28. The non-transitory computer-readable medium of claim of claim 27, wherein determining the distance between each of the one or more pairs of speakers based on the time of flight measurements includes determining the distance based on the respective first, second, third, and fourth time of the pairs of speakers.

* * * * *